(12) United States Patent
Kling et al.

(10) Patent No.: US 7,602,128 B2
(45) Date of Patent: Oct. 13, 2009

(54) DEVICE AND METHOD TO CONFIGURE SAME

(75) Inventors: Sören Kling, Västerås (SE); Gunnar Johansson, Skultuna (SE)

(73) Assignee: ABB AB (SE)

( * ) Notice: Subject to any disclaimer, the term of this patent is extended or adjusted under 35 U.S.C. 154(b) by 0 days.

(21) Appl. No.: 10/547,301

(22) PCT Filed: Mar. 2, 2004

(86) PCT No.: PCT/SE2004/000292

§ 371 (c)(1),
(2), (4) Date: Sep. 11, 2006

(87) PCT Pub. No.: WO2004/079890

PCT Pub. Date: Sep. 16, 2004

(65) Prior Publication Data

US 2007/0013326 A1 Jan. 18, 2007

Related U.S. Application Data

(60) Provisional application No. 60/450,675, filed on Mar. 3, 2003.

(51) Int. Cl.
*H02P 5/00* (2006.01)

(52) U.S. Cl. .......................... 318/66; 318/110; 318/111; 318/112; 318/113

(58) Field of Classification Search .................. 700/83; 318/66, 110, 111, 112, 113, 600
See application file for complete search history.

(56) References Cited

U.S. PATENT DOCUMENTS

| | | | | |
|---|---|---|---|---|
| 5,221,189 A * | 6/1993 | Henningsen | ............... | 417/12 |
| 6,007,227 A * | 12/1999 | Carlson | ................. | 700/67 |
| 6,160,365 A * | 12/2000 | Younger et al. | ............... | 318/16 |
| 6,163,129 A * | 12/2000 | Younger et al. | ............. | 318/799 |
| 6,192,286 B1 * | 2/2001 | Oku | ............................. | 700/95 |
| 6,199,018 B1 * | 3/2001 | Quist et al. | ................... | 702/34 |
| 6,278,254 B1 | 8/2001 | Harkey | | |
| 6,445,332 B1 * | 9/2002 | Younger et al. | ............. | 341/176 |
| 6,445,966 B1 * | 9/2002 | Younger et al. | ............... | 700/83 |
| 6,653,804 B1 * | 11/2003 | Kureck | ........................... | 318/3 |
| 2002/0117986 A1 | 8/2002 | Becerra et al. | | |

FOREIGN PATENT DOCUMENTS

EP 1037373 A2 9/2000

* cited by examiner

*Primary Examiner*—Bentsu Ro
*Assistant Examiner*—David S Luo
(74) *Attorney, Agent, or Firm*—St. Onge Steward Johnston & Reens LLC

(57) ABSTRACT

A motor controller for controlling an electric motor including a soft starter and a human-machine interface for control and configuration of the soft starter. The soft starter includes a visual display and a selector associated with the visual display. A method to configure a motor controller for controlling an electric motor, including a soft starter and a human-machine interface for control and configuration of the soft starter. A computer program and graphic user interface for carrying out the method.

33 Claims, 9 Drawing Sheets

DEVICE AND METHOD TO CONFIGURE SAME

TECHNICAL FIELD

The present invention is concerned with a soft starter for control of electric motors. In particular it is concerned with a motor controller comprising a soft starter with an improved human-machine interface (HMI) for configuration and control of the soft starter.

BACKGROUND ART

Many electric motors used in industrial and commercial processes and buildings are controlled by soft starter equipment. Soft starters are used to start a motor and stop a motor in a desired manner, such as to eliminate electrical surges in the electrical supply and/or overheating in the motor. Soft starters are also used to reduce or eliminate mechanical shocks or vibration which might otherwise occur under start/stop conditions causing wear and damage to the pumps, fans etc. driven by the motors. A soft starter typically measures the input current and/or voltage of the motor and regulates the input current and/or voltage received by the motor to achieve a desired start or stop performance.

The soft starter generally requires configuration to suit the circumstances of each application. During configuration the parameters influencing in particular the starting current, and also factors such as the speed, start up time or maximum input current etc. have to be selected or set up in the soft starter according to what kind of start or stop is desired for the motor and/or the equipment it is driving. Soft starters may comprise many features and functions and the configuration is often therefore somewhat difficult and time consuming.

Although AC motors are used all over the world, the AC supply frequency may be either 50 Hz or 60 Hz and the range of operating currents and operating voltages supplied is extensive. Protection against overheating of the semiconductor components is necessary as well as other types of overload protection. In summary, there usually are a great number of factors or parameters that require configuration or selection in order to be able to use a soft starter.

Soft starters are well known in general industrial practice, see for example, EP 1 037 373 A2, entitled "Command module for motor control system".

One type of soft starter, available from the Danfoss company, model MCD 3000, comprises a display where an operator or technician may read information about various functions. Associated with the display is a series of buttons with which the operator may select particular functions or features to be checked and/or configured. The buttons are each marked with a pictorial symbol representative of certain functions. However, the display also includes coded names for functions, which may be difficult for an operator to interpret correctly. In addition, a difficulty with this type of design is that the operator must recognise the meaning of the symbols correctly in order to be able to configure and/or operate the soft starter efficiently. This requires extensive customer support, beginning with comprehensive user manuals in order to configure such a soft starter correctly.

SUMMARY OF THE INVENTION

The aim of the present invention is to remedy one or more of the above mentioned problems. This and other aims are obtained by a motor controller as defined in the appended claims.

A first aspect of the invention is a human-machine interface for control and configuration of a motor controller comprising a soft starter, the soft starter including a visual display and selection means such as switches or buttons associated with the visual display, wherein said visual display comprises means for presenting one or more operational and/or control functions including various parameter settings etc. of the soft starter, and said associated selection means comprise hardware and/or software switch means for selecting the one or more operational and/or control functions so displayed and/or navigating to another function or menu option, all in accordance to the relative position on the visual display of the functions and/or menu options so displayed versus the relative position of the associated switches or buttons.

A major advantage of the present invention is that configuration of the soft starter for the motor controller is considerably more simple to set up and operate. The configuration functions, as well as operation or control functions, are displayed one at a time in plain text and easily understood words on the display, and the user simply selects that option or selects another menu or navigation option. This is done by simply selecting a selection means, for example that button amongst the associated selection means, the hardware or software switches or buttons, the relative position of which corresponds to the relative position of the desired option on the display.

Another advantage of the invention is that it may control a plurality of electric motors, that is, up to three electric motors. This means that the control functions enabled by the motor controller are available for up to three processes or part processes. Operational data such as number of starts, and of lists of standard events as well as lists of alarms, is thus available for a plurality of motor applications and or processes.

In another aspect of the invention a method is described for configuring a soft starter of a motor controller according to the invention. The method include use of information displayed by the visual display and use of the selection means to select a function and/or to navigate to other options.

In another aspect of the invention a computer program is described for carrying out the method according to the invention. In another aspect of the invention a computer program product comprising a computer program for carrying out the method of the invention is described. In another aspect of the invention a computer data signal embodied in a carrier wave is described. In another, further aspect of the invention a graphical user interface is described for displaying configuration for the motor controller and/or operational data for one or more of the electric motors so controlled.

BRIEF DESCRIPTION OF THE DRAWINGS

A more complete understanding of the method and system of the present invention may be had by reference to the following detailed description when taken in conjunction with the accompanying drawings wherein.

DESCRIPTION OF THE PREFERRED EMBODIMENTS

Figure 1:
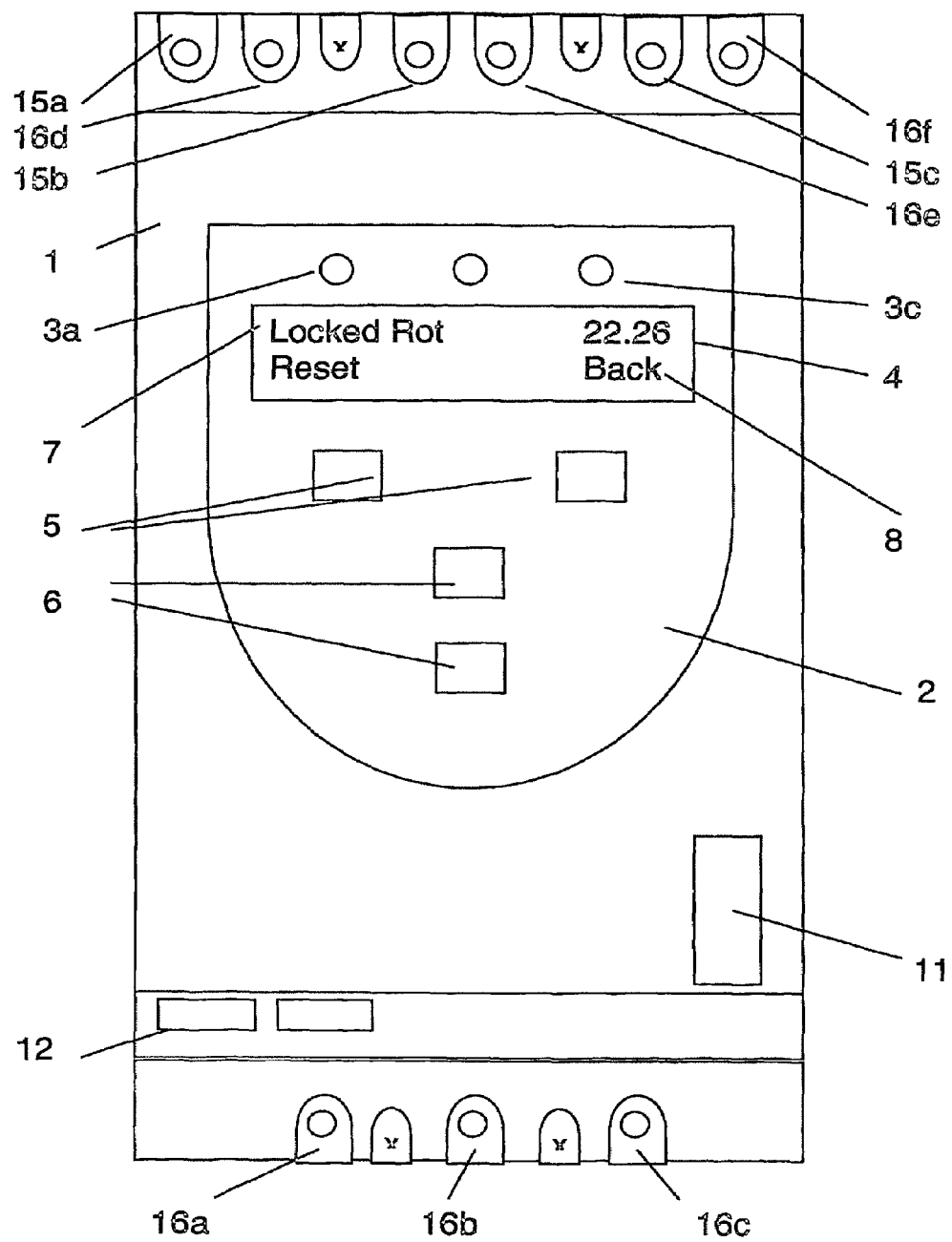
FIG. 1 shows a front view of a soft starter according to an embodiment of the invention.

FIG. 1 shows a front elevation of a motor controller 1 comprising a soft starter according to the present invention. A control panel 2 is located on the front of the soft starter 1. The control panel 2 comprises a display 4 and selection buttons 5 and navigation buttons 6. Three indicator lights are indicated, a Power On indicator 3a, green when lit, a Fault indicator 3b, red, and a Protection indicator, yellow when lit. The features of display 4 and buttons 5, 6 comprise the essential elements of the HMI for configuring and operating the soft starter.

Also indicated in FIG. 1 are two data interfaces 12 and an aperture in the front panel pf the soft starter for a field bus connection 11. The position of the main power supplied to the soft starter, Power line in, is indicated by the three terminals 15a, b, c at the top of the soft starter. The position of 6 power lines for connection out to one or more electric motors is shown at the top and bottom of the starter, 16a-16f. The outputs 16d, 16e, and 16f are provided for connection to an external bypass contactor (not shown in FIG. 1). The soft starter is a semiconductor based AC motor controller and motor starter according to IEC: 60947-4-2-1999+A1:2001 and UL Standard UL 508. In use the semiconductor based thyristors get very warm and so it is common practice to bypass the soft starter, when it is not in active use for starting or stopping. The use of such a bypass avoids developing too much heat, especially if the device is somewhat enclosed in cabinets etc, as well as saving energy. This method of protecting the device against excess temperatures is in addition to the current Overload Protection included in the motor controller.

Figure 2:
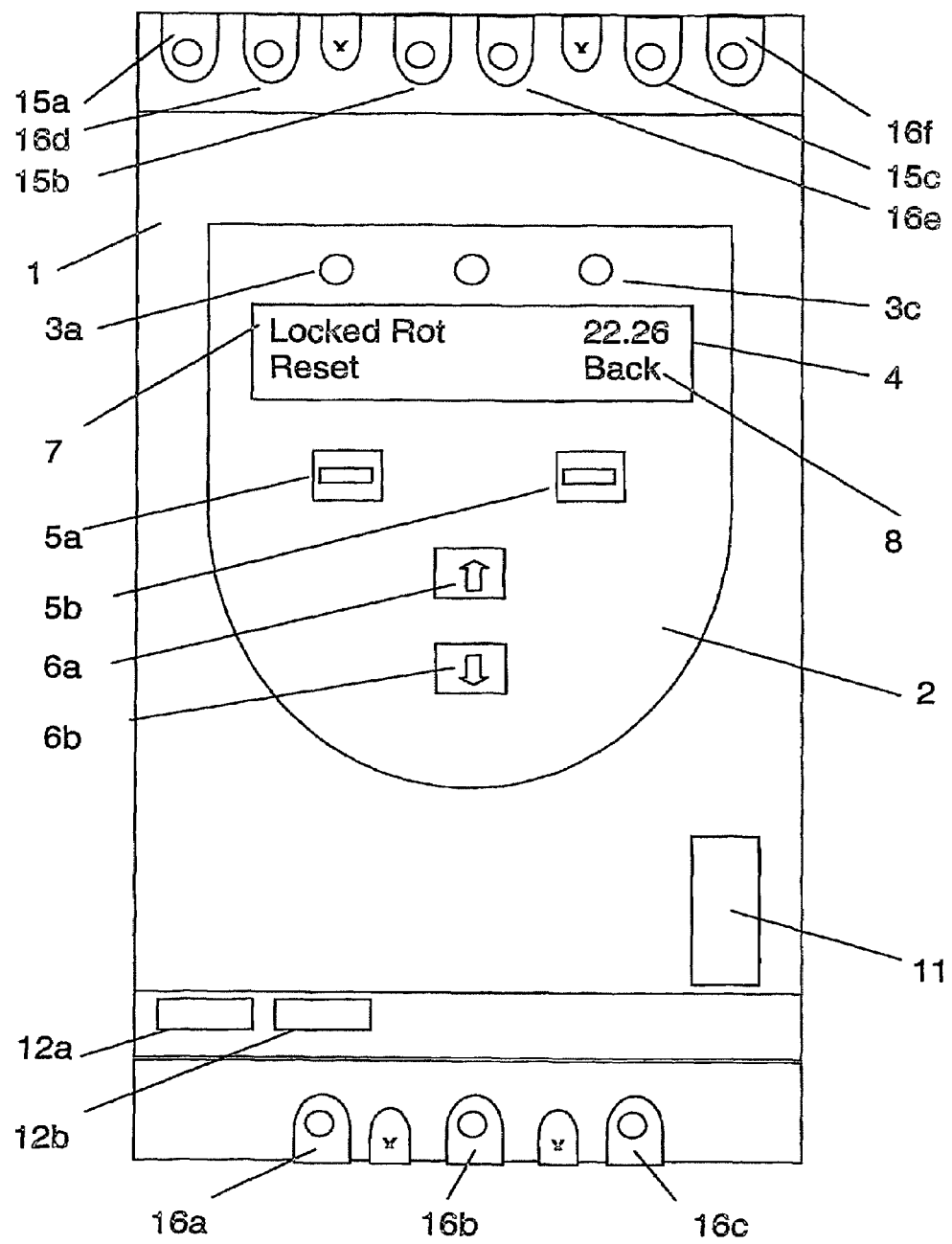
FIG. 2 shows a front view of the soft starter according to an embodiment of the invention.

A preferred embodiment of the soft starter is shown in FIG. 2. In FIG. 2, a selection button 5a is shown, together with a selection and/or back button 5b. A navigation and/or up button 6a is shown together with a navigation and/or down button 6b.

Figure 4:
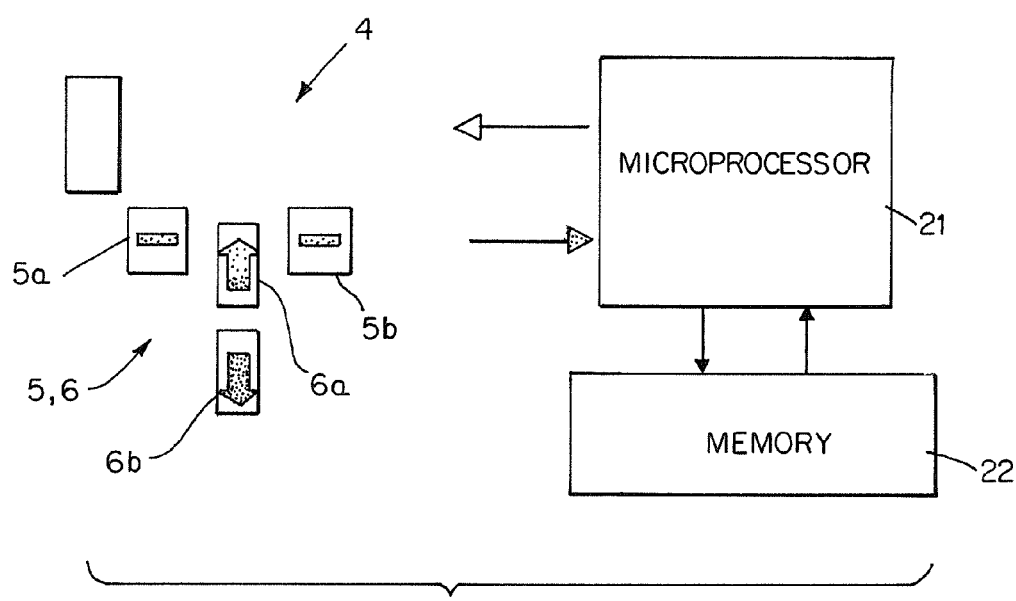
FIG. 4 shows a block diagram of components of a system that are comprised in the soft starter of the motor controller.

FIG. 4 shows elements of a system in a simplified block diagram. A display 4 associated with selection means 5, 6 which may, for example, be buttons corresponding to 5a, 5b, 6a, 6b. A microprocessor 21 is shown and a memory means 22. Selections made by the selection means 5, 6 embodied as button 5a, b, 6a, b or in other forms are registered with the microprocessor and stored if relevant in working memory and/or in long term storage memory. The functions displayed at the time of selections being made are also displayed by means of the microprocessor, so that the selection options available are provided on display means 4 by program means run by the microprocessor 21 and the selection options actually made are saved in the memory means 22. The display is preferably a LCD (Liquid Crystal Display) but may be any other means including touch sensitive screen materials.

Figure 3A:
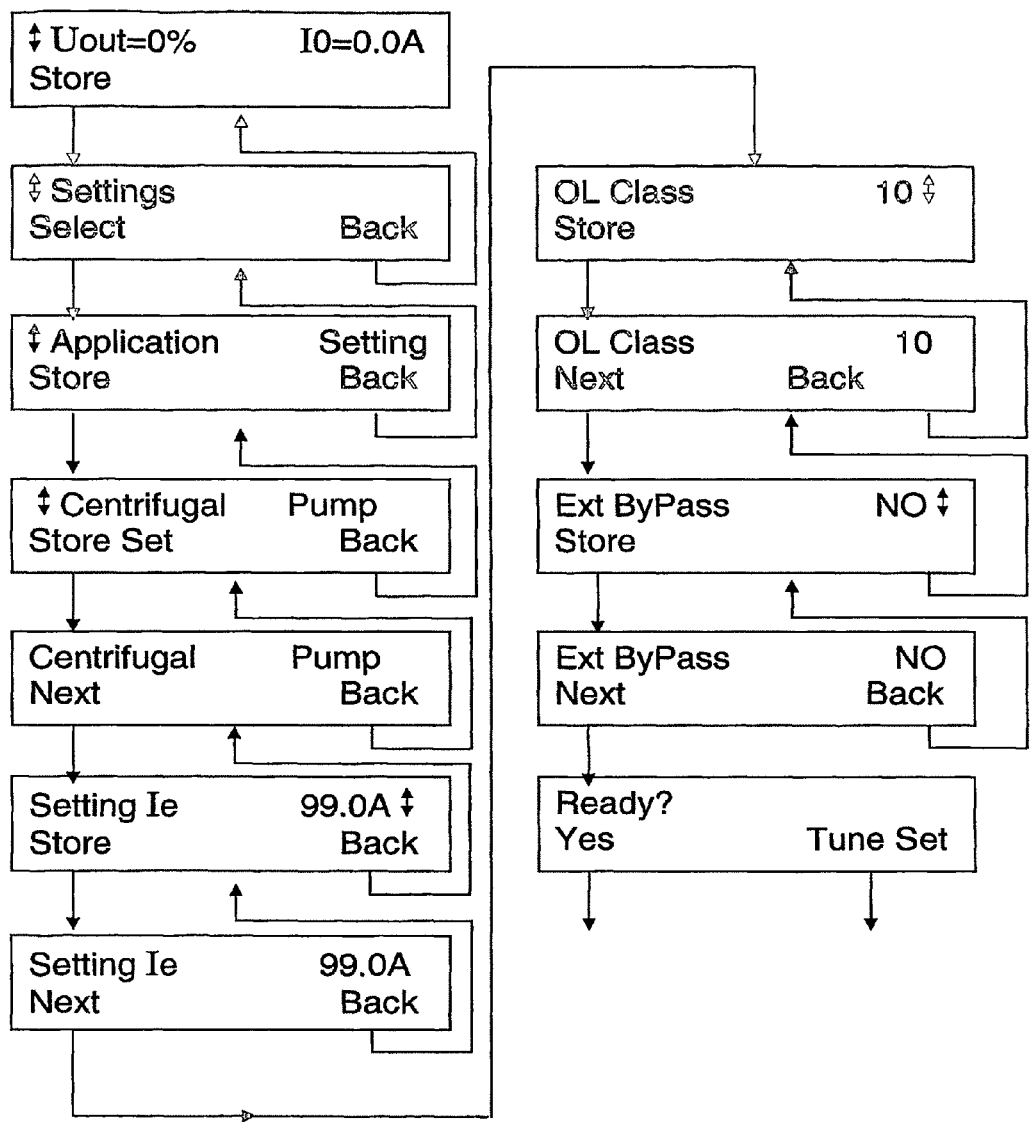
FIGS. 3a, 3b shows a flowchart for a method for configuring the preferred embodiment to control a flow creating means, in this case, a centrifugal pump.
Figure 3B:
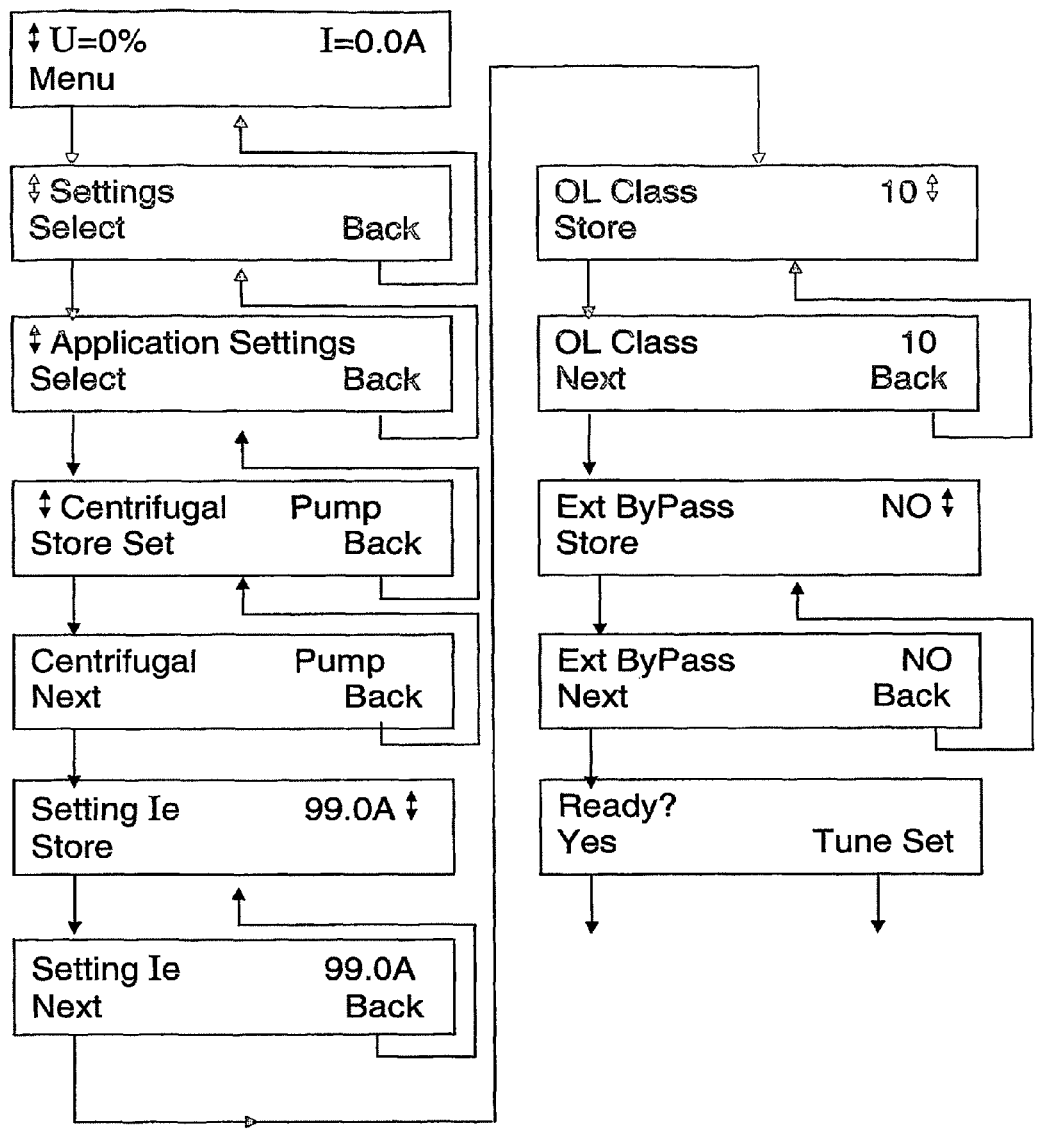

A method to configure the soft starter to control a flow creating means such as a fan or pump, but in this case a centrifugal pump is shown in FIG. 3. The figure shows a flowchart containing representations of the actual text that is displayed by display 4 while configuring and navigating through part of the menu system of the soft starter.

The first box, box 1 shows the display shown when the soft starter is on and connected to power so that the Power On indicator shows green. In this method configuration of a particular application, for a centrifugal pump, is recited to show an exemplary method for configuration according to the invention. The left selection button 5a is selected, moving on to the second box. Selection of the select/up button 6a, not shown in FIG. 3, would step the display, as suggested by the up/down arrow beside the word settings on the display, up or down through the following list of settings step by step, which may comprise:

Application settings
Basic settings
Functional settings
Presentation settings
Service settings
All settings
Changed settings
Reset all settings Selection of left select button 5a results in box 3, but selection of right selection 5b would have moved the display back a step to box 2. Keys 6a or 6b are pressed to step the application list through the available common industrial applications for an electric motor one by one such as:

Centrifugal Pump
Hydraulic Pump
Centrifugal Fan
Axial Fan
Compressor
Conveyor
Crusher
Mixer
Bow Thruster When Centrifugal Pump is displayed, pressing the left selection button 5a, and selecting Store Set, results in going on to box 5 (but pressing right selection button 5b would have resulted in stepping back one step to box 4). Selecting left selection button 5a again results in moving to box 6, where pressing the up/select 6a or down/select button 6b results in changing the Motor Current value (Ie) top right of the display, as suggested by the up/down arrow beside the 99.0 A value shown opposite the Setting Ie label on the display.

The soft starter may accept at least two motor connection methods, in line and inside Delta. When configuring for a motor connected in-line, 100% of the desired initial current may be selected. When configuring a motor that is connected as inside Delta, a value of 58% of the desired initial current should be chosen.

When the appropriate initial current Ie value is shown, it is stored by pressing the left selection button 5a which selects the operation Store, and moves the method on to box 7 where the stored value is displayed and selection of left selection button 5a again, Next, takes the user to box 8. Here, the desired overload protection class is selected from a list displayed as before, by stepping or scrolling the available protection types through a list by means of the up/select button 6a and/or the down selection button 6b. In this example, overload (OL) class 10 has been selected.

Selecting the Store option by means of pressing the left selection button 5a results in the method going on to box 9 where the selected, stored OL Class is displayed and the method moves forward by selecting Next by pressing the left selection button 5a. Box 10 presents the option of configuring for an external bypass contactor, and using the up/select 6a, down/select 6b, buttons to toggle YES, NO as required. Result is stored by selecting Next with the left selection button 5a, resulting in box 11 where selecting YES with the left selection button 5a results in the completion of the configuration, and selecting Tune Set with the right selection button 5b would result in options to adjust ramp times, initial voltage, current limit etc.

Figure 6:
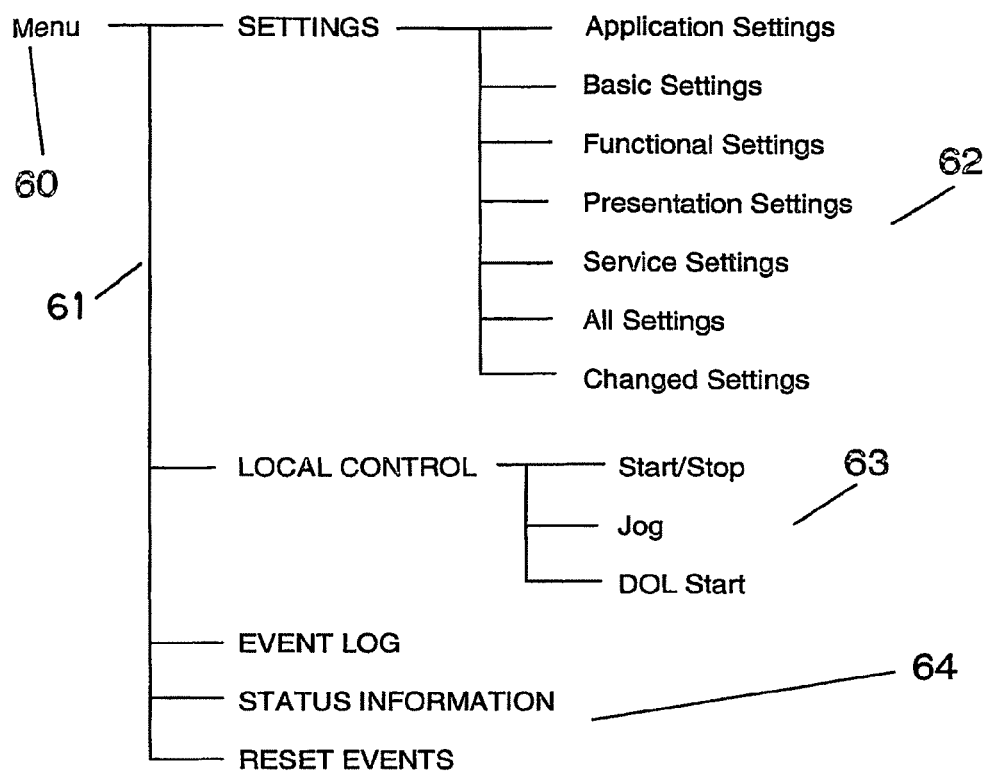
FIG. 6 shows schematically the logical arrangement of functions and options of the human machine interface visible via the display means.

FIG. 6 shows how the functions of the HMI are divided up into levels. This enables simple navigation with a minimum of key pressing or equivalent selection by means of the up 5a, down 5b selection means. Menu level 61 provides access to functions grouped under the headings of SETTINGS, LOCAL CONTROL, EVENT LOG, STATUS INFORMATION and RESET EVENTS. It can be seen that Local Control includes functions of Start/Stop, Jog and DOL (Direct On-Line) start.

Figure 7:
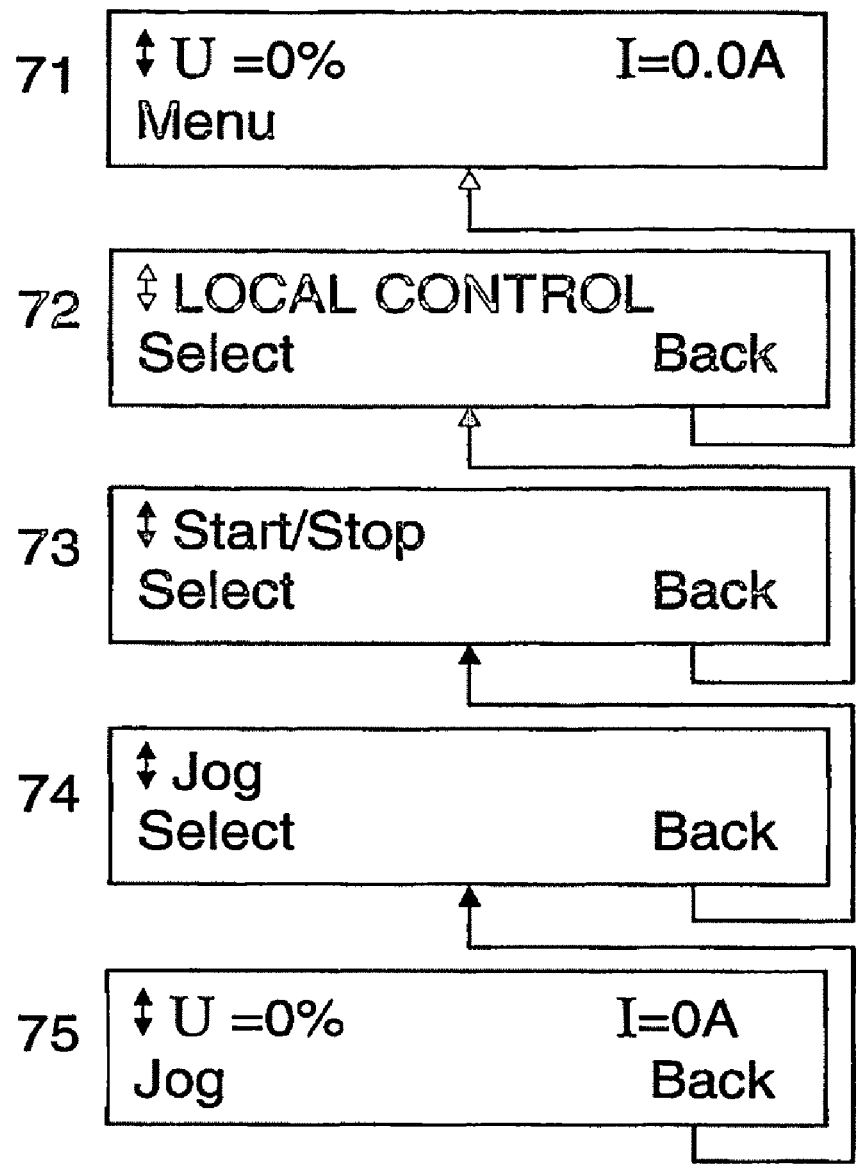
FIG. 7 shows a flowchart for a method for configuring the preferred embodiment to control a flow creating means.

FIG. 7 shows a flowchart for a method to "step"or jog the motor via the motor controller using the Jog function of the HMI. The method begins 71 with the normal display of the top menu level 61 (see FIG. 6). In the upper part of the display an up/down arrow symbol is displayed. Pressing the upper or lower navigation key 6a or (see FIG. 2b) results in stepping the part of the display showing the up/down arrow (↕), one function group at a time, cycling through the groups SETTINGS, LOCAL CONTROL, EVENT LOG, STATUS INFORMATION and RESET EVENTS (FIG. 6). Pressing left selection button 5a while LOCAL CONTROL is displayed in the up/down display part and Select is displayed correspondingly lower left in display results in moving on to step 72.

At step 72 Local Control, the upper 6a or lower 6b (FIG. 2b) navigation keys may be pressed, which would result in stepping the display one function at a time through the LOCAL CONTROL function group comprising functions Start/Stop, Jog, and DOL Start. To jog the motor, the up or down navigation buttons 6a or 6b are pressed until Jog appears as shown in step 74 (while alternatively pressing the right selection button 5b (FIG. 2b) would select Back and step 71). To continue the method to step or jog the motor, the left selection button 5a, now corresponding to the option Select in left side of the display, is pressed when the display shows Jog in the upper left part of the display as indicated in step 74. At step 75 pressing the left selection button 6a, thus in a position relative to the position of Jog in the display, will jog the motor once. Pressing and holding the button down makes the motor controller jog the motor until the button is released. Pressing right selection button 6b would move control Back one step to 74.

The configuration of the soft starter, as for the example described above for a centrifugal pump has been described as carried out using the HMI of the soft starter. However the same method and display schemes are may also be carried out using a computer or similar connected to the soft starter. FIG. 1 shows two data ports 12. In FIG. 2, data port 12a may represent a standard serial data port and data port 12b another type of data port. The soft starter comprises circuit means, connection means and software means such that the procedures available via the HMI are equally available via a computer connected via data port 12a. This means in practice that instead of physically pressing buttons 5a,b, 6a, b on the front of the soft starter, the user input is carried out by means of mouse clicks on images of buttons or other selection devices displayed on a suitable computer screen.

Figure 5:
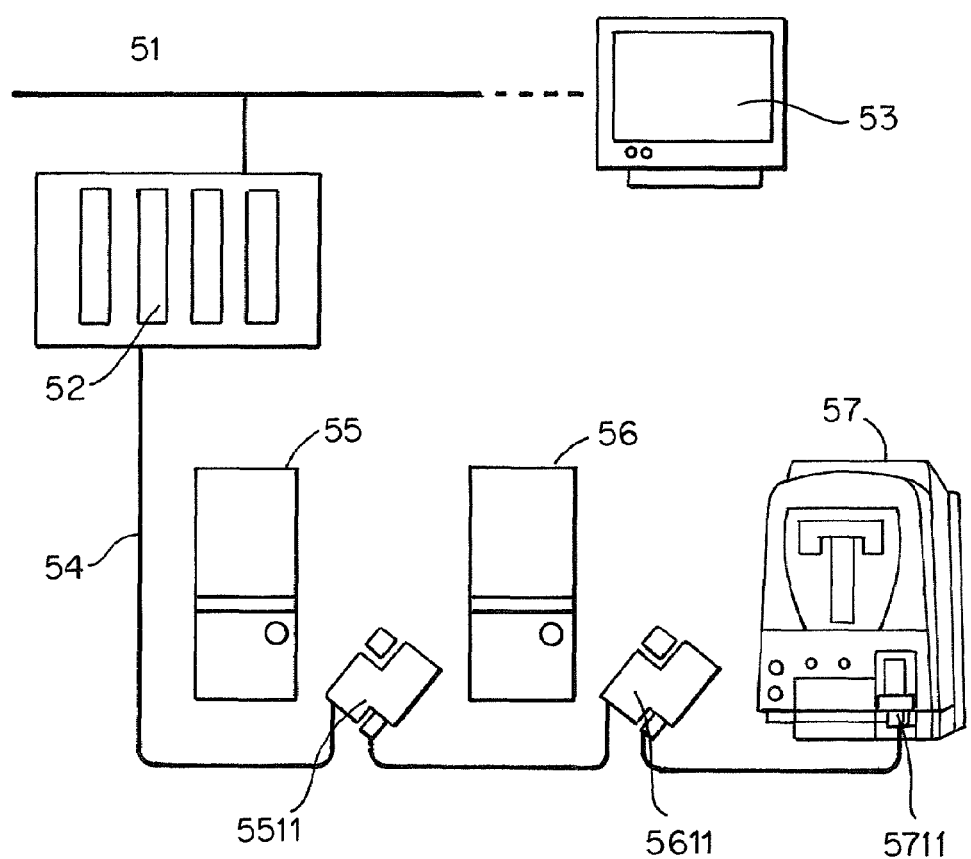
FIG. 5 shows a schematic diagram for connection of the motor controller to a field bus network.

FIG. 5 shows in a schematic way how one or more motor controllers may be connected via a field bus network to a control system. FIG. 5 shows a data network 51 of a control system and a computer or workstation 53 connected to the control system. The control system comprises a bank of controllers 52, and a field bus 54 to which three of the soft starter motor controllers according to the invention are connected for digital exchange of data between the motor controllers and the control system. The connection is made by field bus plugs 5511, 5611, 5711 into the field bus socket of the soft starter (see 11 in FIGS. 1, 2).

Similarly to the data ports 12, the soft starter comprises a field bus connection 11 which allows the data collected by the soft starter to be available for interrogation and communication via a field bus. Thus by means of either a direct serial data connection, or by means of a computer connected to a network that is connected to the field bus network, a soft starter may be configured using a computer nearby or remotely. It is also the case that the soft starter may be configured over any data network including over the Internet by means of one of those two data connections 12a or the field bus connection 11.

Configuration may also be carried out using wireless means such as an IR or short-range radio frequency means (e.g., Bluetooth) equipped computer, mobile phone or PDA or other mobile computing device. A wireless node (not shown) may be connected to a data port 12a or to the field bus network that the soft starter is connected to via field bus connector 11. By means of the wireless node connected in some way to the soft starter the soft starter may be configured wirelessly using the same methods as herein described. Any wireless protocol capable of providing reliable transmissions in an industrial environment may be used, including standards or protocols such as Bluetooth, Wireless LAN (WLAN). For the communication there may be further requirements imposed by the field busses or other parts of the control system. In a preferred embodiment of the invention the communication technology used is based on the Bluetooth system. The fact that the range of a Bluetooth device is limited to around 10 m may be advantageous in environments with many radio devices or areas where it is very important to keep the radio interference levels as low as possible.

The communications from the soft starter via a data network also comprise a computer data signal. The computer data signal is for configuration and/or control and/or operation of a motor controller (1) arranged to provide control and soft starting to one or more electric motors embodied in a carrier wave. The data signal complies with one or more formats, for example internally formatted as an XML file, and includes means to identify the sending soft starter and the type of data such as number of starts, saved events, saved alarms, configured overload protection etc. for said motor controller.

The microprocessor (or processors) of the soft starter, or of a motor controller including the soft starter, comprises at least one central processing unit CPU performing the steps of the method according to an aspect of the invention. This is performed with the aid of one or more computer programs, which are stored at least in part in memory accessible by the processor. It is to be understood that the computer programs may also be run on one or more general purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in a ROM, RAM, PROM EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server. Removable memory media such as removable hard drives, bubble memory devices, flash memory devices and commercially available proprietary removable media such as the Sony memory stick and memory cards for digital cameras, video cameras and the like may also be used.

The computer programs described may also be arranged in part as a distributed application capable of running on several different computers or computer systems at more or less the same time.

In another embodiment of the motor controller comprising the soft starter, a bypass contactor is built in to the same apparatus, thus making connections to an external bypass contactor unnecessary. In addition, configuration tasks are simplified by having the bypass contactor already built-in to the soft starter.

Figure 8:
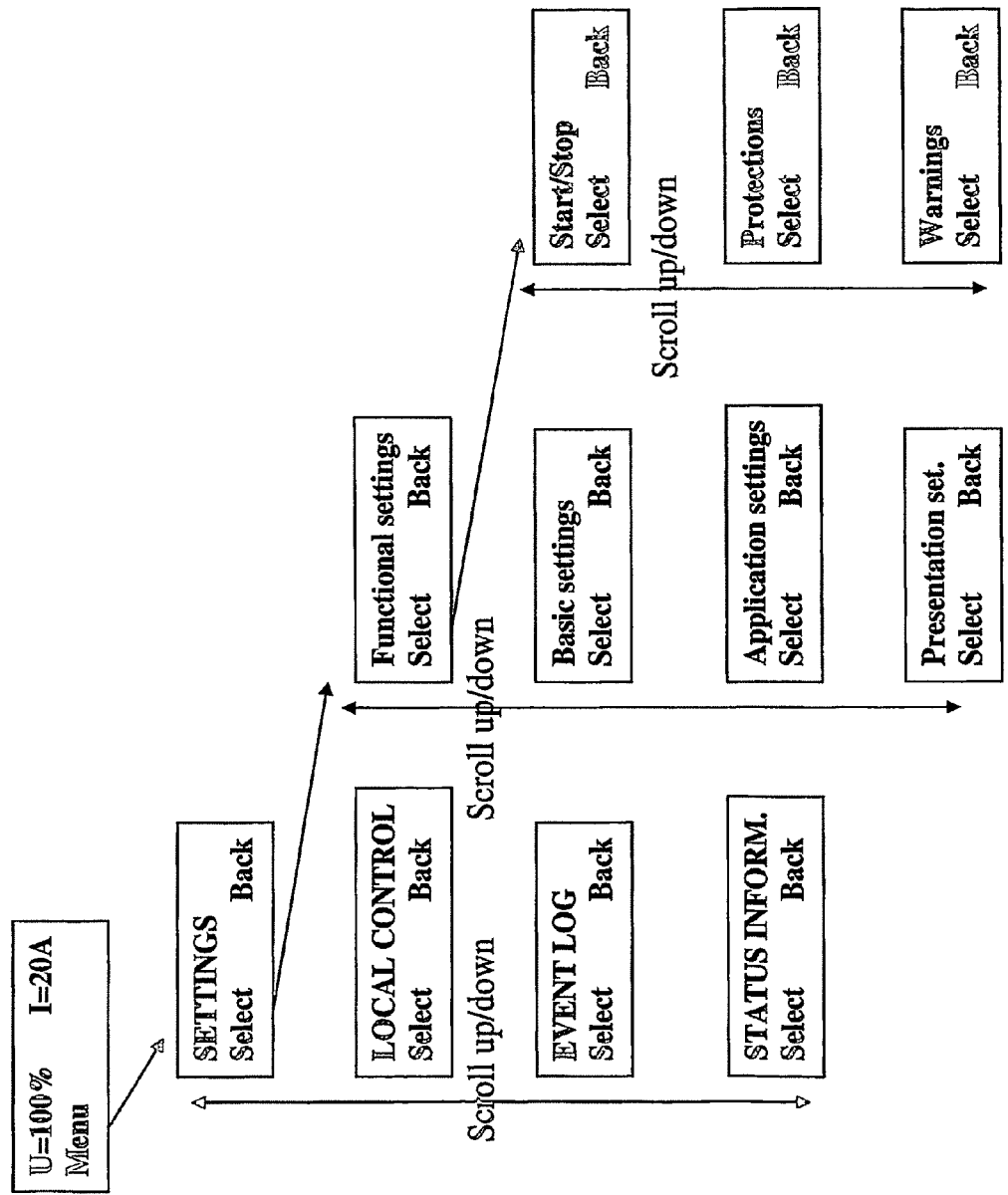
FIG. 8 shows schematically function and navigation options of the HMI of the motor controller.

FIG. 8 shows another representation of the functions and navigation options of the HMI of the motor controller shown in FIG. 6. From FIG. 8 the effect of making selections with the selection means 5, 6 such as an up 6a, down 6b or left 5a, right 5b may be seen. Thus a sequence from the start menu of pressing Down to Settings functions, pressing Down to Select, pressing Left to activate Select, so accessing Functional Settings; then pressing Down to select functional settings; so accessing either Start/stop, Protections or Warnings. It can be seen that selections are made or activated by activating (pressing real buttons or selecting representations of buttons on a display or computer screen) the selection means (button) such as Down that corresponds to the position on the display, out of lower or upper, that is required. Similarly selections of the left, right buttons are chosen when the required selection is on the left or right of the display.

In a yet further embodiment of the invention, the HMI may be embodied as a touch screen. In this case, text lines or images included in the display 4 of the preferred embodiment, and the select, navigation buttons 5a, b and 6a, b, may each be embodied as images on a touch screen. Configuration may be carried out according to the same method but executed by means of touching parts of the screen instead of pressing buttons, or by clicking with a computer mouse or other pointing/selection device.

The invention claimed is:

1. A motor controller for controlling an electric motor comprising:
    a soft starter; and
    a human-machine interface for control and configuration of the soft starter, said human-machine interface comprising:
        a visual display;
        means for visually presenting one or more functions of the soft starter and one or more menu options in two or more positions on the visual display, and
        two or more selection means associated with the visual display for selecting the one or more functions or menu options according to the position of each of the two or more functions or menu options on the visual display,
    wherein the position of each of the two or more selection means on the human-machine interface corresponds to a position of the function or menu option operable by the selection means on the visual display,
    wherein the two or more positions on the visual display include at least one left position and at least one right position, wherein the two or more selection means comprise a left selection button for selecting a function or option displayed in the left position of the visual display and a right selection button for selecting a function or option displayed in the right position of the display.

2. The motor controller according to claim 1, wherein the two or more selection means comprise an upper selection button and a lower selection button for selecting functions or options displayed in upper and lower positions on the visual display.

3. The motor controller according to claim 1, wherein the two or more positions on the visual display include at least one upper position and at least one lower position, wherein the selection means comprise means for selecting either from an option in the upper position in the display or an option in the lower position in the display.

4. The motor controller according to claim 1, wherein said motor controller may provide control and soft start functions to a plurality of electric motors.

5. The motor controller according to claim 1, wherein said motor controller may provide control and soft start functions to an AC electric motor running on one or more phases.

6. The motor controller according to claim 1, wherein said motor controller may provide control and soft start functions to an AC electric motor running at either of two selectable frequencies.

7. The motor controller according to claim 1, wherein said motor controller comprises connections for an external by pass contactor.

8. The motor controller according to claim 1, wherein said motor controller comprises one or more data ports capable of serial data transmission.

9. The motor controller according to claim 1, wherein said motor controller comprises one or more connections for a field bus.

10. The motor controller according to claim 1, wherein said motor controller comprises one or more memory means for processing data.

11. The motor controller according to claim 1, wherein said motor controller comprises one or more memory means for storing data from configuration and/or data from measurements and operations.

12. The motor controller according to claim 1, wherein said motor controller comprises a built-in by pass contactor.

13. The motor controller according to claim 1, wherein said motor controller comprises one or more connections for a data network compatible with an Ethernet standard.

14. The motor controller according to claim 1 adapted to configure and operate an electric motor to drive one of a Centrifugal Pump, a Hydraulic Pump, a Centrifugal Fan, an Axial Fan, a Compressor, a Conveyor, a Crusher, a Mixer, and a Bow Thruster.

15. The motor controller according to claim 1 adapted to configure and operate an electric motor controlled by the motor controller.

16. The motor controller according to claim 1 adapted to configure and operate an electric motor by means of a process running on one or more computers to supervise a function of a device arranged driven by at least one electric motor controlled by the motor controller.

17. The motor controller according to claim 1, further comprising:
    a processor;
    one or more computer readable media; and
    a computer program comprised in said computer readable media and executing on said processor, wherein said computer program comprises computer code means and/or software code portions for presenting the one or more functions of said soft starter and menu options on the visual display and processing selections received by the selections means.

18. The motor controller according to claim 1, further comprising:
at least one data port;
wherein the motor controller is configured to send, via said data port, a computer data signal for configuration of the motor controller, arranged to provide control and soft starting, running and soft stopping to one or more electric motors, embodied in a carrier wave, in that the signal comprises one or more configured functions and/or values for configuration data for said motor controller.

19. The computer data signal according to claim 18, further comprising:
a wireless node including a short range wireless means;
wherein said computer data signal is communicated by the short range wireless means according to a Bluetooth standard or a WLAN standard.

20. A graphical user interface of a computerised device for displaying configuration functions, menu options and parameter settings for a motor controller for control and soft starting, soft stopping of one or more electric motors according to claim 1.

21. The graphical user interface according to claim 20, further comprising a representation of the visual display of the motor controller and the selection means of the controller in a graphical user interface on a computer display screen of a computing device.

22. The graphical user interface according to claim 20, wherein the computing device may be a portable computing device comprising any from the list of: IR or Bluetooth equipped computer, mobile phone or PDA or other mobile computing device.

23. The graphical user interface according to claim 20, wherein the configuration data values displayed are arranged to be displayed upon activation of a part of the graphical representation of the visual display or selection means of the motor controller using a computer mouse, touch screen, stylus, keypad, keyboard or other computer display selection means.

24. The motor controller according to claim 1, wherein the two or more selection means includes:
at least two selection buttons for selecting the one or more functions and menu options; and
at least one navigation button for navigating to another function.

25. A method to configure a motor controller for controlling an electric motor, including a soft starter and a human-machine interface for control and configuration of the soft starter, the method comprising:
presenting one or more functions of said soft starter and one or more menu options on a visual display of said soft starter,
selecting one of the one or more functions of said soft starter or one of the one or more menu options by activating a selection means of a plurality of selection means associated with the visual display, which selection means being the only one of the plurality that corresponds to the position of the selected function or menu option on the visual display;
wherein selecting the functions or menu options includes selecting a menu function or operation presented on the visual display by activating either an up or a down navigation selection means and selecting a menu function or operation presented on the visual display by activating either a left or a right selection means.

26. The method according to claim 25, further comprising:
selecting an increased or decreased value presented on the visual display by activating either an up or a down navigation selection means.

27. The method according to claim 25, further comprising:
selecting a menu function or operation presented on the visual display by activating either an up or a down navigation selection means.

28. The method according to claim 25, further comprising:
selecting one of the one or more menu options on the visual display of said soft starter, by means of operating one of a plurality of selection means associated with the visual display, which selection means being the only one of the plurality that corresponds to the position of the menu option on the visual display.

29. The method according to claim 25, further comprising:
selecting a value for a function of the soft starter via the visual display of said soft starter by means of operating one of a plurality of selection means associated with the visual display, which selection means being the only one of the plurality of selection means that corresponds to the position of the function value on the visual display.

30. The method according to claim 25, further comprising:
selecting an option by means of selecting a representation of a left selection button or a right selection button on a computer display screen of a computing device connected to the motor controller via a data port or field bus connection of the motor controller.

31. The method according to claim 25, further comprising:
selecting an option by means of selecting a representation of a upper selection button or a lower selection button on a computer display screen of a computing device connected to the motor controller via a data port or field bus connection of the motor controller.

32. The method according to claim 25, further comprising:
selecting an option by means of selecting one or more representations of a selection buttons on a computer display screen of a computing device connected to the motor controller in part via a wireless connection.

33. The method according to claim 25, further comprising:
sending a data transmission using wireless communication means configured to operate according to a standard compatible issued by the Bluetooth Group.

* * * * *